United States Patent
Johnson et al.

(10) Patent No.: US 7,533,915 B2
(45) Date of Patent: May 19, 2009

(54) EXTENDER-ARM

(76) Inventors: David B. Johnson, 576 N. St. Asaph St., Alexandria, VA (US) 22314; Jeffrey A. Schmidt, 4808 8th Rd. North, Arlington, VA (US) 22203

(*) Notice: Subject to any disclaimer, the term of this patent is extended or adjusted under 35 U.S.C. 154(b) by 798 days.

(21) Appl. No.: 10/626,529

(22) Filed: Jul. 25, 2003

(65) Prior Publication Data
US 2005/0017523 A1    Jan. 27, 2005

(51) Int. Cl.
*A47F 13/06* (2006.01)
(52) U.S. Cl. .......................... 294/19.1; 294/24; 294/51; 15/144.4; 15/236.01
(58) Field of Classification Search ............... 294/19.1, 294/24, 51; 15/144.4, 236.01, 236.02; 81/16, 81/53.1
See application file for complete search history.

(56) References Cited

U.S. PATENT DOCUMENTS

| | | | |
|---|---|---|---|
| 316,524 A | 4/1885 | Colby et al. | |
| 406,744 A | 7/1889 | Kriner | |
| 824,968 A | 7/1906 | Wright | |
| 2,869,914 A | 1/1959 | Yoakley, Jr. | |
| 2,961,674 A | 11/1960 | Hunt | |
| 3,199,905 A | 8/1965 | Johnson | |
| 4,374,600 A | 2/1983 | van Zelm | |
| 4,399,498 A | 8/1983 | Bacevius | |
| 4,432,042 A | 2/1984 | Zeller | |
| 4,510,561 A | 4/1985 | Peters | |
| 4,683,592 A | 8/1987 | Strongwater | |
| 4,726,263 A * | 2/1988 | Lake .......................... 81/15.9 |
| 4,819,139 A | 4/1989 | Thomas | |
| 4,870,712 A | 10/1989 | Markus | |
| 4,974,129 A | 11/1990 | Grieb et al. | |
| 5,103,384 A | 4/1992 | Drohan | |
| 5,116,093 A * | 5/1992 | Burns .......................... 294/19.1 |
| 5,333,342 A | 8/1994 | Huang | |
| 5,348,359 A | 9/1994 | Boozer | |
| 5,358,506 A | 10/1994 | Green et al. | |
| 5,460,346 A | 10/1995 | Hirsch | |
| 5,471,698 A | 12/1995 | Francis et al. | |
| 5,520,702 A | 5/1996 | Sauer et al. | |
| 5,669,646 A | 9/1997 | Fiocca et al. | |
| 5,685,586 A * | 11/1997 | Miller .......................... 294/24 |
| 5,709,694 A | 1/1998 | Greenberg et al. | |
| 5,759,188 A | 6/1998 | Yoon | |
| 5,823,592 A * | 10/1998 | Kalidindi .......................... 294/24 |
| 5,860,430 A | 1/1999 | Thorsheim | |
| 6,098,389 A | 8/2000 | Crunkelton | |
| 6,168,287 B1 | 1/2001 | Liu | |
| 6,183,485 B1 | 2/2001 | Thomason et al. | |
| 6,253,956 B1 | 7/2001 | Khan et al. | |

(Continued)

*Primary Examiner*—Michael S Lowe

(57) ABSTRACT

An extender-arm for use in an automobile. The extender-arm includes a handle section, a gripping section, and an extension section connecting the handle section to the gripping section. The handle section includes an actuator for effecting open-and-close movement of a gripper or other device in the gripper section. The handle also includes a socket into which a variety of tools—that may be useful in an automobile or other one environment—may be removably inserted. The extender-arm may include a rechargeable power source for connection with the tools inserted into the socket. The extension section may include an ancillary device such as a cellular phone holding clip, and/or a coin holding structure. Also, a pouch may be provided to store the tools that are removably attachable to the socket.

1 Claim, 5 Drawing Sheets

U.S. PATENT DOCUMENTS

| | | |
|---|---|---|
| 6,293,206 B1 | 9/2001 | Simon et al. |
| 6,315,340 B1 | 11/2001 | Chen |
| 6,315,425 B1 | 11/2001 | Confrey |
| 6,390,427 B1 * | 5/2002 | McConnell et al. .... 248/231.61 |
| 6,419,371 B1 * | 7/2002 | McCalla et al. ............. 362/119 |
| 6,427,960 B1 | 8/2002 | Gehring et al. |
| 6,428,172 B1 | 8/2002 | Hutzel et al. |
| 6,439,525 B1 | 8/2002 | Gehring et al. |
| 6,457,756 B2 | 10/2002 | Pronesky et al. |
| 6,502,949 B1 | 1/2003 | Horiyama et al. |
| 6,520,556 B1 | 2/2003 | Hsu |
| 6,536,911 B1 | 3/2003 | DiAngelo |
| 6,550,490 B1 | 4/2003 | Morton et al. |

\* cited by examiner

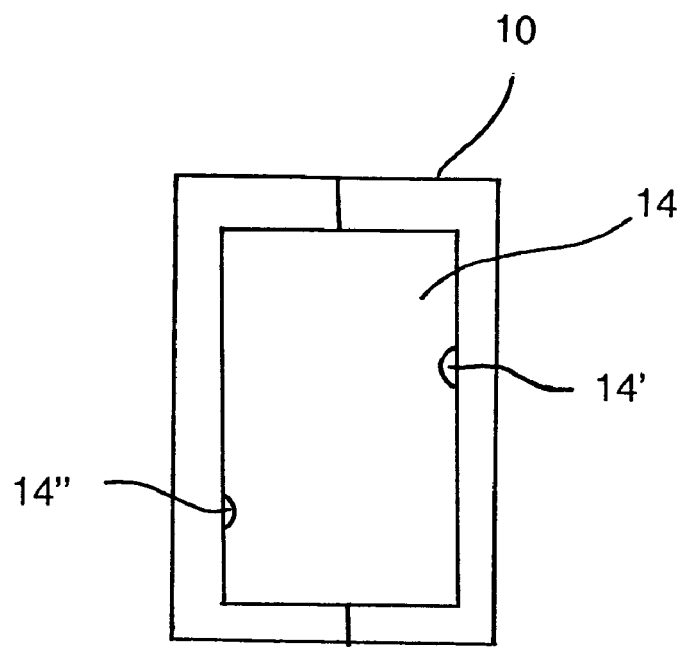
FIG. 2A
FIG. 2B
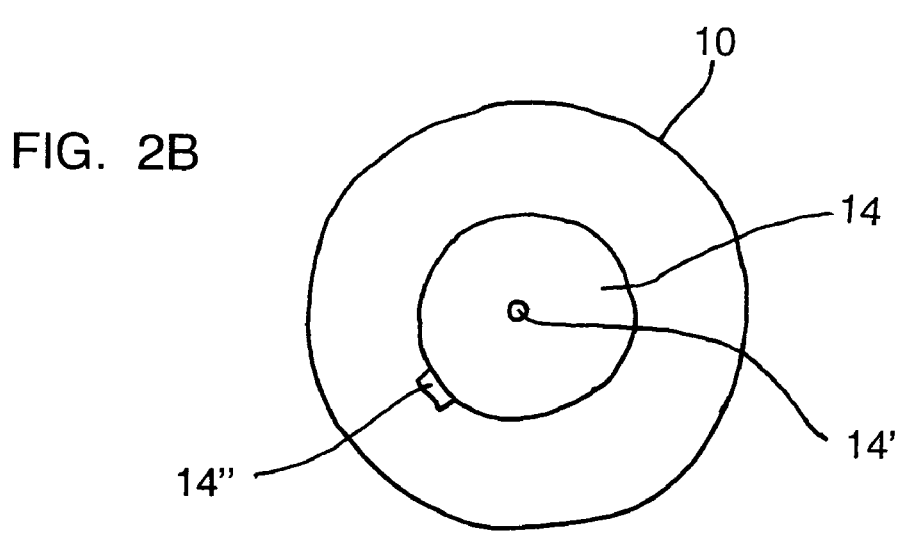

EXTENDER-ARM

BACKGROUND

FIELD OF THE INVENTION

This invention relates to a small, lightweight extender-arm that can be placed in an automobile and used for a variety of purposes. The purposes include, but are not limited to, grabbing parking tickets from machines and/or attendants at parking garages, punching in numbers at a drive-through automatic teller machine (ATM), grabbing fast food from a fast food restaurant drive through, passing objects to persons in other parts of the automobile, and holding a map for easy viewing. The extender-arm may also have other useful tools attachable thereto so as to make the extender-arm a multi-purpose tool. By way of non-limiting example, the other useful tools may include an ice scraper, and a flashlight.

SUMMARY OF THE INVENTION

The extender-arm will perform several very useful functions that have long been difficult for a vehicle occupant to accomplish. Whenever a person pulls up to an ATM or up to the ticket booth of a parking garage, it is often a struggle to extend his/her arm out enough to punch in the appropriate numbers or grab a parking ticket. People do not typically want to pull in too close because they are afraid of scratching up their car or, worst case, hitting the machine or booth. The extender-arm would be easily accessible when the time arises to use it and could easily be put back in place. The extender-arm has a handle at one end with an actuator that would allow a gripper located at another end to open and close so as to grab the tickets and/or punch in numbers. The extender-arm could be opened to grab a ticket or other item. Further, the gripping end may be adjusted at an angle to grab hold of the ticket, or other item such as, by way of non-limiting example, a bag of fast food. To facilitate these and other functions, the gripper could be closed to manipulate items, such as for pulling a ticket away from a machine. The process could be reversed, whereby a user puts money into the gripper of the extender-arm so as to pay a parking attendant or cashier for example. The end of the arm can also be placed, and locked, in a closed position for use in punching buttons of an ATM machine, as well as can be opened and closed for easily passing money and receipts for the transaction (as well as the bank or credit card being used during the transaction). In short, this invention provides a low-cost solution to problems that arise everyday for a great number of people.

Further, the extender-arm has a socket at one end thereof so that other tools—useful to an automobile occupant—may be attached thereto. By way of example, and not limitation, the socket may accommodate an ice scraper, flashlight, or a storing post on which the extender-arm can be mounted.

BRIEF DESCRIPTION OF THE DRAWINGS

The above and other objects and advantages of embodiments consistent with the concepts of the present invention will become more apparent by describing in detail embodiments consistent with the concepts and principles thereof with reference to the accompanying drawings, wherein like reference numerals designate like or corresponding parts throughout the several views, and wherein:

FIGS. 2A and 2B are alternative, exemplary, end views of the extender-arm shown in FIG. 1, as viewed in the direction of arrow X;

DETAILED DESCRIPTION OF NON-LIMITING EXAMPLES OF EMBODIMENTS CONSISTENT WITH THE CONCEPTS OF THE PRESENT INVENTION

Non-limiting examples of embodiments consistent with the concepts of the present invention will now be described with reference to the figures.

Figure 1:
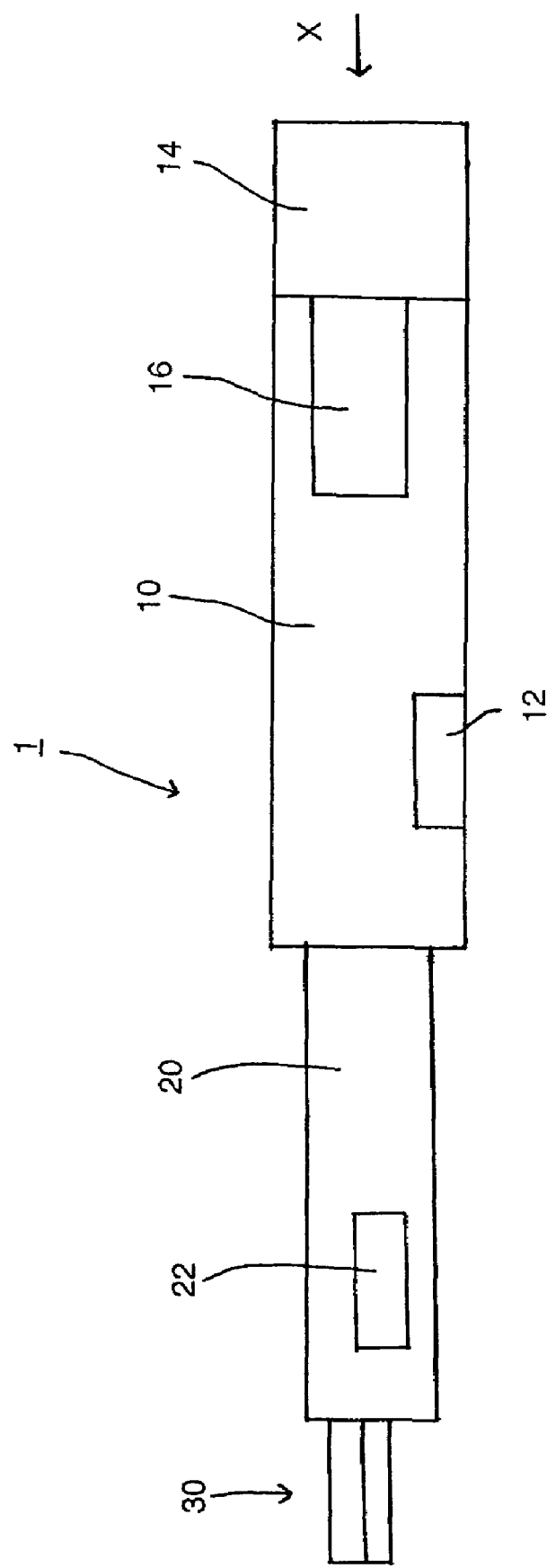
FIG. 1 is a schematic side view of an extender-arm consistent with the concepts of the present invention.

FIG. 1 is a schematic side view of an extender-arm 1 consistent with the concepts of the present invention. The extender-arm 1 includes a handle section 10, an extension section 20, and a gripping section 30, each of which will be described in turn below.

The handle section 10 includes an actuator 12 for opening and closing the griping section 30 to allow items to be grasped and manipulated by the gripping section 30. Actuator 12 may be of the conventional "trigger" type, or any other suitable type. The specific mechanisms—for transmitting an input at the handle section 10 to the gripping section 30 so as to open and close a mechanism for griping—are conventionally known and are not the subject of this specification.

Additionally, the handle section 10 includes a socket 14 into which various tools and mounting structures may be inserted, which allows the extender-arm to act as a multi-functional tool. The handle section 10, and socket 14, may have any suitable cross-sectional shape. By way of example, and not limitation, FIGS. 2A and 2B respectively show the handle section 10 and socket 14 each as having a rectangular and a circular cross-section. Further, although the cross-sectional shapes of the handle section 10 and socket 14 match as shown in the figures, they need not. That is, by way of non-limiting example, the handle section 10 may have a rectangular cross section, whereas the socket 14 may have a circular cross section, or vise versa. The socket 14 includes two structures 14' and 14" for assisting in mounting tools in the socket, and/or for electrical connection to the tools. The specific details of the structures 14' and 14" are not particularly limited. By way of example, and not limitation, the structures 14' and 14" may be electrically conductive detents. The detents would fit into notches on a tool inserted into the socket 14 so as to hold the tool within the socket 14. Additionally, because the structures 14' and 14" are electrically conductive, they may deliver power from the rechargeable power supply 16 to the tool inserted within the socket 14. Alternatively, as shown in FIG. 2B, the structures 14', 14" may be simple electrical contacts. Mechanical attachment of a tool may then be made by screw threads on the interior of the socket, for example. Still further, the structures 14', 14" may be electrically conductive posts for use in a bayonet type connection.

The rechargeable power supply 16 is disposed in the handle section 10 for convenience, but may be located at any point on the extender-arm, and then electrically connected to the structures 14' and 14". The rechargeable power supply 16 is electrically connected to the structures 14' and 14", and may be connected, via those structures 14' and 14" to either a tool (for powering the tool), or to a charging structure (for recharging the rechargeable power supply 16).

Figure 6:
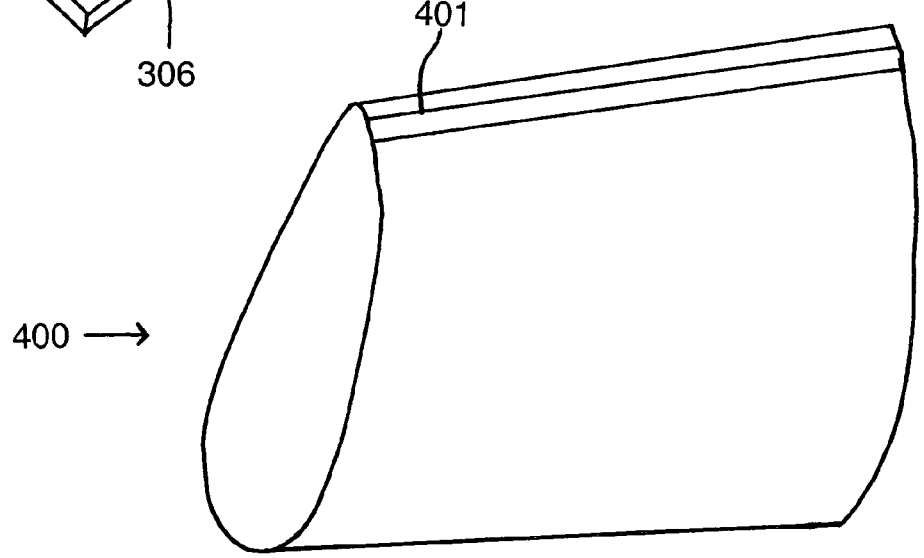
FIG. 6 is a perspective view of a re-sealable pouch consistent with the concepts of the present invention.
Figure 7:
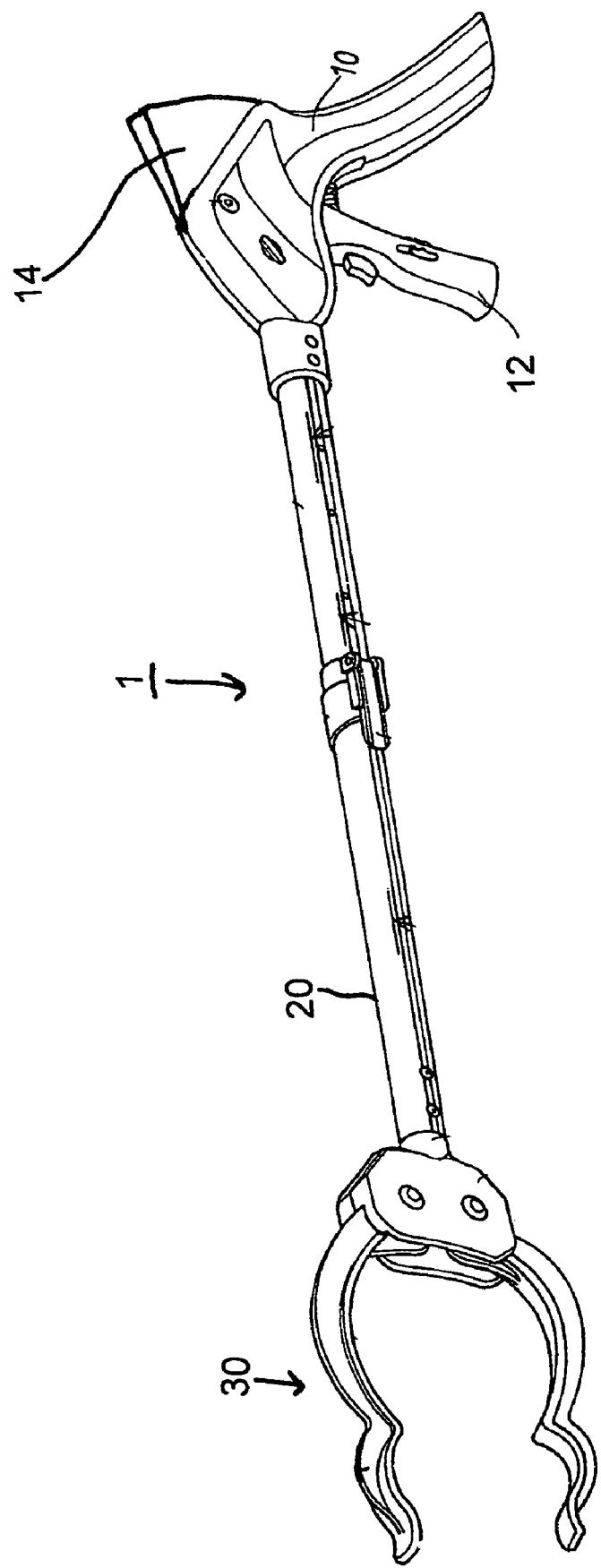
FIG. 7 is a plan view of an extender-arm consistent with the concepts of the present invention.

The tools that may be removably and interchangeably inserted into the socket are not particularly limited. That is, the extender-arm 1 is targeted for use in an automobile and, therefore, any tool that may be useful in an automobile may be adapted to fit in the extender-arm's socket 14. Further, all the removable and interchangeable tools for use in the extender-arm 1 may be packaged in a re-sealable pouch 400 that will fit into an automobile glove box for convenient storage together, so as to avoid loosing the tools. See FIG. 6, wherein a re-sealable pouch 400 is shown as including a re-sealable-opening 401. The re-sealable opening may be made re-sealable by, for non-limiting example, a zipper, velcro™, a zip-lock structure, or the like. In a preferred embodiment the removable and interchangeable tools include an ice scraper and/or a flashlight.

Figure 3:
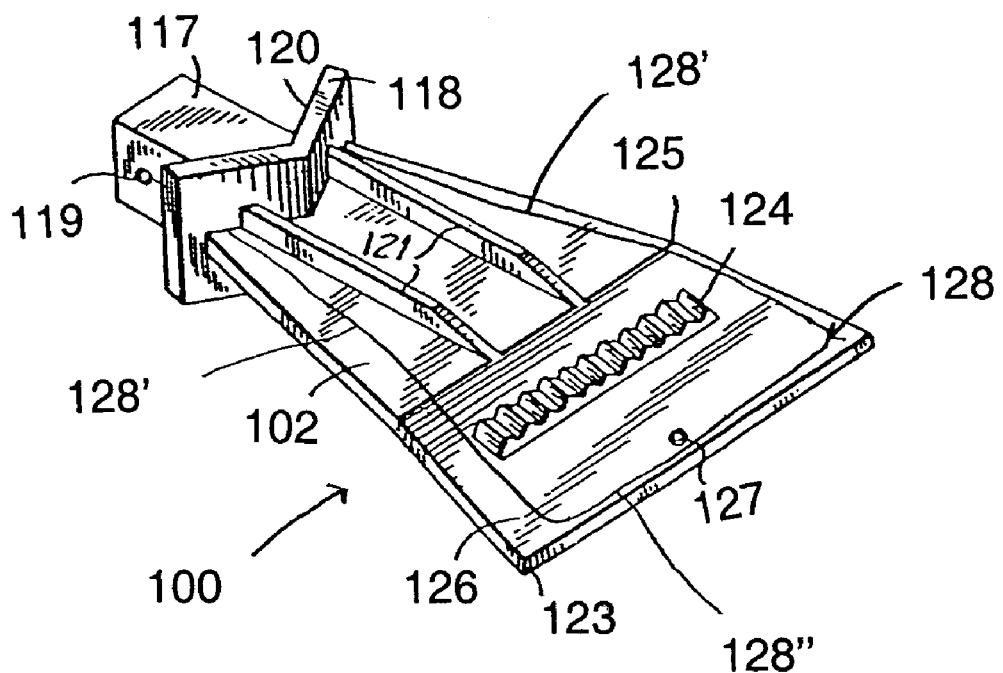
FIG. 3 is a perspective view of an ice scraper mountable to an extender-arm consistent with the concepts of the present invention.

A an ice scraper 100, consistent with the concepts of the present invention, is shown in FIG. 3. The ice scraper 100 includes a mounting section 117 having a cross section complementary to that of the socket 14. A notch 119 is shown on one side of the mounting section 117, and is for engagement with either structure 14' or 14" so as to electrically, and mechanically, connect the ice scraper 100 to the extender-arm 1. That is, notch 119 is made to be electrically conductive. A similar notch is provided on the opposite side of the mounting section 117, but is not shown. A guard 120, having a top surface 118, is provided adjacent to the mounting section 117, and serves to abut the back of the handle section 10 so as to provide a firm mount, as well as serves to prevent ice chips and other debris from entering the mounting socket where they may interfere with the connection between the ice scraper 100 and the extender-arm 1.

Further, exemplary, features of the ice scraper 100 include a head 102, a biased portion 126, a transverse line 125 between the head 102 and biased portion 126, a strip of raised serrations 124, a mounting hole 127, a wire 128, and a chisel-shaped front edge 123. The head 102 is strengthened by ribs 121, because when attached to the extender-arm 1, a significant amount of leverage may be applied to the ice scraper 100. That is, an operator may grasp the handle section 10 as well as the extension section 20 when using the ice scraper 100, thereby placing a significant amount of pressure on the head 102. Thus, in order to reduce the amount of breakage, ribs 121 are provided. The wire 128 includes two sections 128' respectively connected to the notches 119. A middle, high-resistance portion 128" is connected between the sections 128', and serves as a heating element to assist in scraping ice off of an automobile window.

Other features may be incorporated into the ice scraper 100 such as, for example, those disclosed in U.S. Pat. No. 4,870, 712, the entire disclosure of which is incorporated herein by reference.

Figure 4:
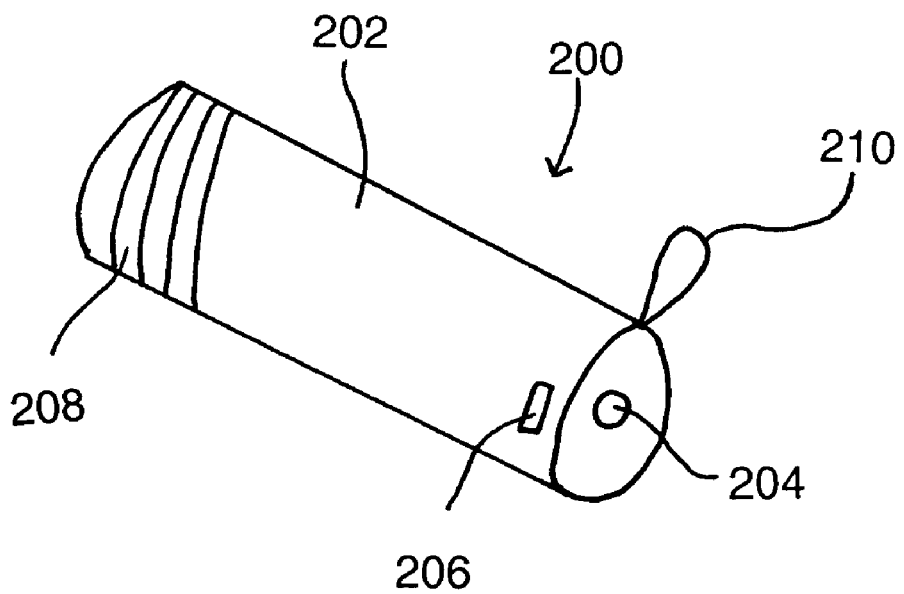
FIG. 4 is a schematic perspective view of a flashlight mountable to an extender-arm consistent with the concepts of the present invention.

An example of a flashlight 200, consistent with the concepts of the present invention, is shown in FIG. 4. The flashlight 200 includes a body 202 having a cross sectional shape that is complementary to that of the socket 14 in the extender-arm 1. The body 202 includes a pair of electrical contacts 206 for electrical connection with the structures 14' and 14" in socket 14, as well as a screw thread 208 for mechanically mounting the flashlight 200 in socket 14. In this embodiment, the electrical and mechanical connections between the tool and the socket 14 are shown as being separate. In this situation, structures 14' and 14" may not be detents but, instead, may be simple electrical contacts. Further, the second (not shown) electrical contact 206 may be mounted on an end of the flashlight 200 that is inserted into socket 14 for electrical connection with a structure 14' in the back of the socket 14, as shown in FIG. 2B. Further, the flashlight 200 includes a light bulb 204, as is conventional in flashlights, and also includes a mounting loop 210. The mounting loop may be made out of any suitable elongate flexible member such as elastic string, leather, metal filament, nylon or plastic filament, etc. The mounting loop 210 offers an alternative manner of mounting the flashlight in the automobile when the flashlight is not in use and is not stored in the re-sealable pouch 400.

Although the ice scraper 100 and flashlight 200 are shown as having different cross-sectional shapes in the figures, for any one particular extender-arm 1 they would have the same cross-sectional shape, and one that is complementary to the cross-sectional shape of the socket 14, so as to be interchangeably and removably mounted to that one extender-arm 1. For purposes of simplicity in illustration, however, one tool was shown with one type of cross-sectional mounting shape, whereas another tool was shown with a different cross-sectional mounting shape.

Figure 5:
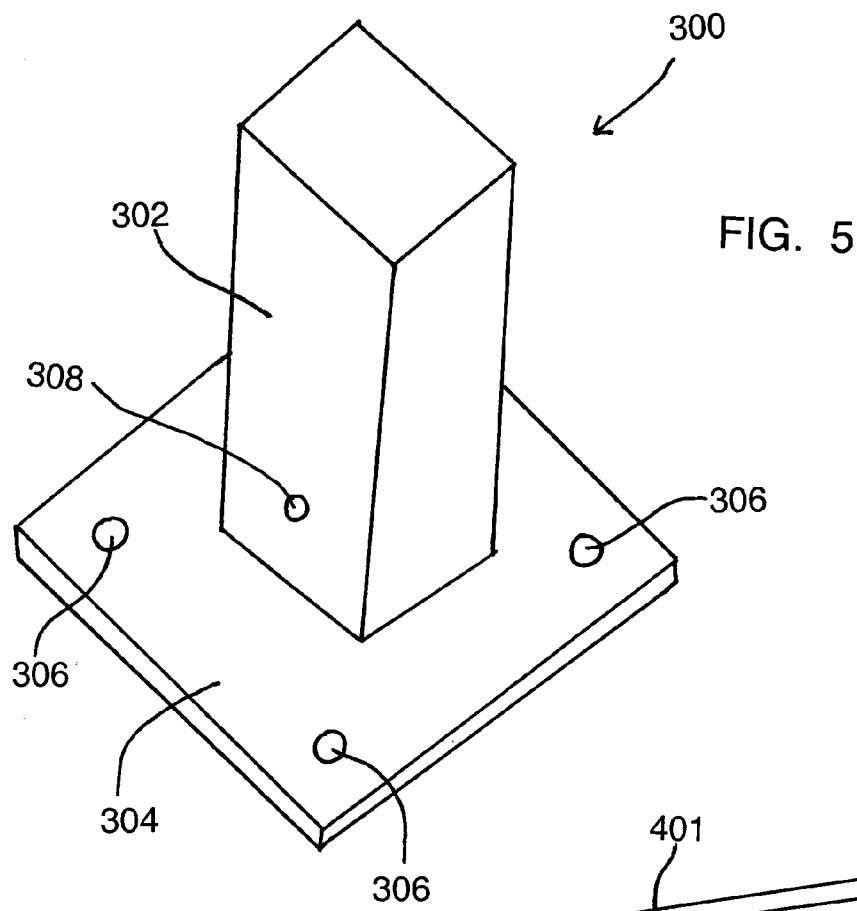
FIG. 5 is a perspective view of a mounting or storing post for an extender-arm consistent with the concepts of the present invention.

For purposes of convenient storage in the automobile, as well as for recharging the rechargeable power supply 16, there may be provided a mounting or storing post 300. For convenience of description the mounting or storing post 300 will be referred to hereinafter as a mounting post 300. Mounting post 300 may be considered a tool. A non-limiting example of a mounting post 300 is shown in FIG. 5. The mounting post 300 includes a body 302 having a cross sectional shape complementary to that of the socket 14. The body 302 includes electrically conductive notches 308 for mating with respective ones of the structures 14' and 14". The electrically conductive notches 308 are connected to the automobile's electrical system so as to provide power to recharge the rechargeable power supply 16 when the extender-arm 1 is mounted on the mounting post 300. A conventional charging circuit may also be provided in the mounting post 300 so as to regulate the amount of power from the automobile's electrical system that is applied to the rechargeable power source 16. Further, the body 302 is connected to a mounting flange 304 that has mounting holes 306 therein. Any suitable fastener may be disposed through holes 306 to connect the flange 304 to a convenient surface in the automobile. Alternatively, by way of non-limiting example, the flange 304 may be mounted to an automobile, or other, surface by adhesive.

For example, the flange 304 may be mounted to the floor of the automobile between the driver's and passenger's seats. Then, the overall length of the extender-arm 1 may be adjusted so that a map or other paper held in the gripping section may conveniently be viewed by either the driver or passenger. Thus, the extender-arm 1, when mounted to the mounting post 300, acts as a convenient storage and display device for storing things such as coins as well as a cellular phone, and for displaying maps as well as papers that may have directions written thereon.

While the mounting post 300 is shown as having a rectangular cross-section, it may also have a circular cross-section as does the socket 14 shown in FIG. 2A, or any other suitable cross-section that is complementary with that of the socket 14. Further, although the mounting post 300 is shown as having notches 308, it may include any suitable electrically conductive and mechanically coupling structure for mounting the extender-arm 1 thereto. That is, by way of non-limiting example, the mounting post 300 may include screw threads and a separate electrically conductive connection in a manner similar to that shown for the exemplary flashlight 200 in FIG. 4.

As an alternative, non-limiting example, if the rechargeable power supply is not included with an extender-arm 1, the extender-arm 1 may simply be mounted to the ceiling of an automobile by, for example, velcro™ straps. Still further, even if there is no rechargeable power supply, the extender-arm 1 may still be mounted on a mounting post 300 so as to perform map and direction/paper holding, cellular phone holding, and coin holding, functions in the automobile.

On an end of the handle section 10 opposite to that on which the socket 14 is disposed, there is an extension section 20. The extension section 20 provides length to the extender-arm. The specifics of the extension section 20 are conventionally known and, therefore, will not be disclosed in detail here. The extension section 20 may have any suitable cross-sectional shape, may be flexible or articulateable so as to allow the gripping section 30 to be disposed at an angle relative to the handle section 30, and may include one or more ancillary devices 22 therein. The details of a flexible, and articulateable, extension section 20 are disclosed in U.S. Pat. Nos. 4,374,600 and 3,199,905, the disclosures of which are incorporated herein by reference. By way of example, and not limitation, an ancillary device 22 may include a cellular phone holding clip, a change receptacle or coin holder, a ticket holder in the form of a clip, and the like. The extension section 20 may be of any suitable length, and its length may be variable.

The gripping section 30 is connected to the handle section 10 by the extension section 20. The specifics of the gripping section 30 are conventionally known and, therefore, a detailed discussion is not included here. By way of example, and not limitation, the details of the gripping section 30, the extension section 20, and the handle section 10 other than the socket portion 14 and rechargeable power supply 16, may be consistent with those as disclosed in U.S. Pat. No. 6,520,556, the entire disclosure of which is hereby incorporated herein by reference. Further, any suitable gripping members may be used in the gripping section 30, and various gripping members may be removably-mounted in the gripping section 30. Moreover, the gripping members may be replaced by other open-and-closable type tools such as, by way of non-limiting example, a cutting member or scissors, pliers, and the like.

The extender-arm is the first of its kind that addresses the problem of a vehicle occupant not being able to reach a parking garage ticket machine, an ATM, a fast-food restaurant drive-through window, passengers in the back seat of a van or other lengthy automobile, or any other object outside of the reach of the vehicle occupant. This idea provides a convenient, simple, and low-cost, solution to these everyday problems and can be of great benefit to a great number of people.

It is contemplated that numerous modifications may be made to the extender-arm of the present invention without departing from the spirit and scope of the invention as defined in the following claims.

We claim:

1. An extender-arm comprising:
   a handle section, said handle section comprising an actuator, a proximal end, and a distal end, wherein a tool receiving socket is disposed at said proximal end, said tool receiving socket including a connection structure for connection with a tool inserted in said socket; and
   an open-and-close section connected to said distal end of said handle section so as to be operable by said actuator;
   wherein said open-and-close section comprises a gripping section;
   wherein the gripping section is configured so as to be capable of grasping and holding an object.

\* \* \* \* \*